Dec. 31, 1946. G. F. RACKETT 2,413,468
COLOR CORRECTION OF COLOR PICTURES
Filed Nov. 11, 1942 2 Sheets—Sheet 1
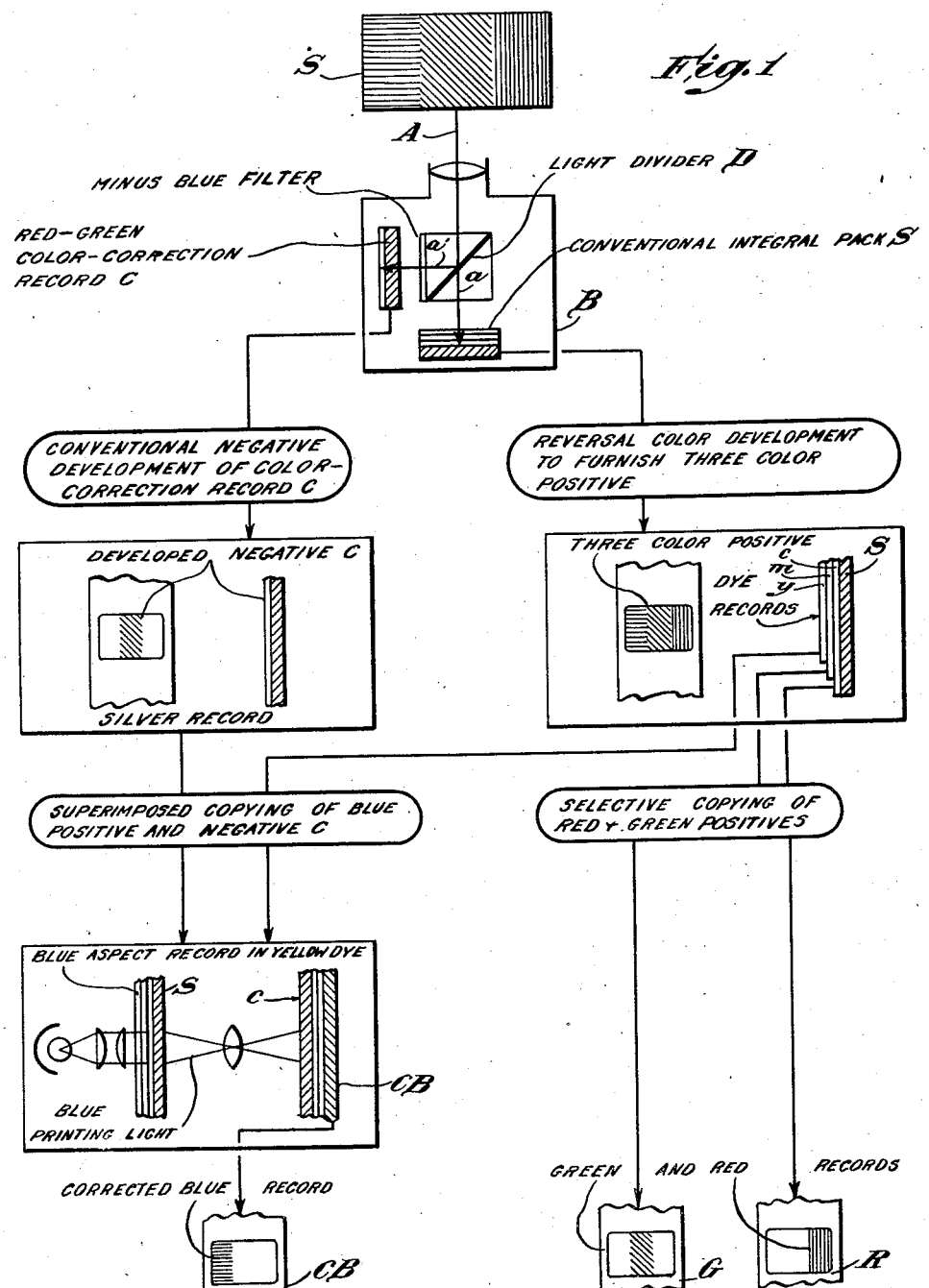

Dec. 31, 1946.  G. F. RACKETT  2,413,468
COLOR CORRECTION OF COLOR PICTURES
Filed Nov. 11, 1942  2 Sheets-Sheet 2
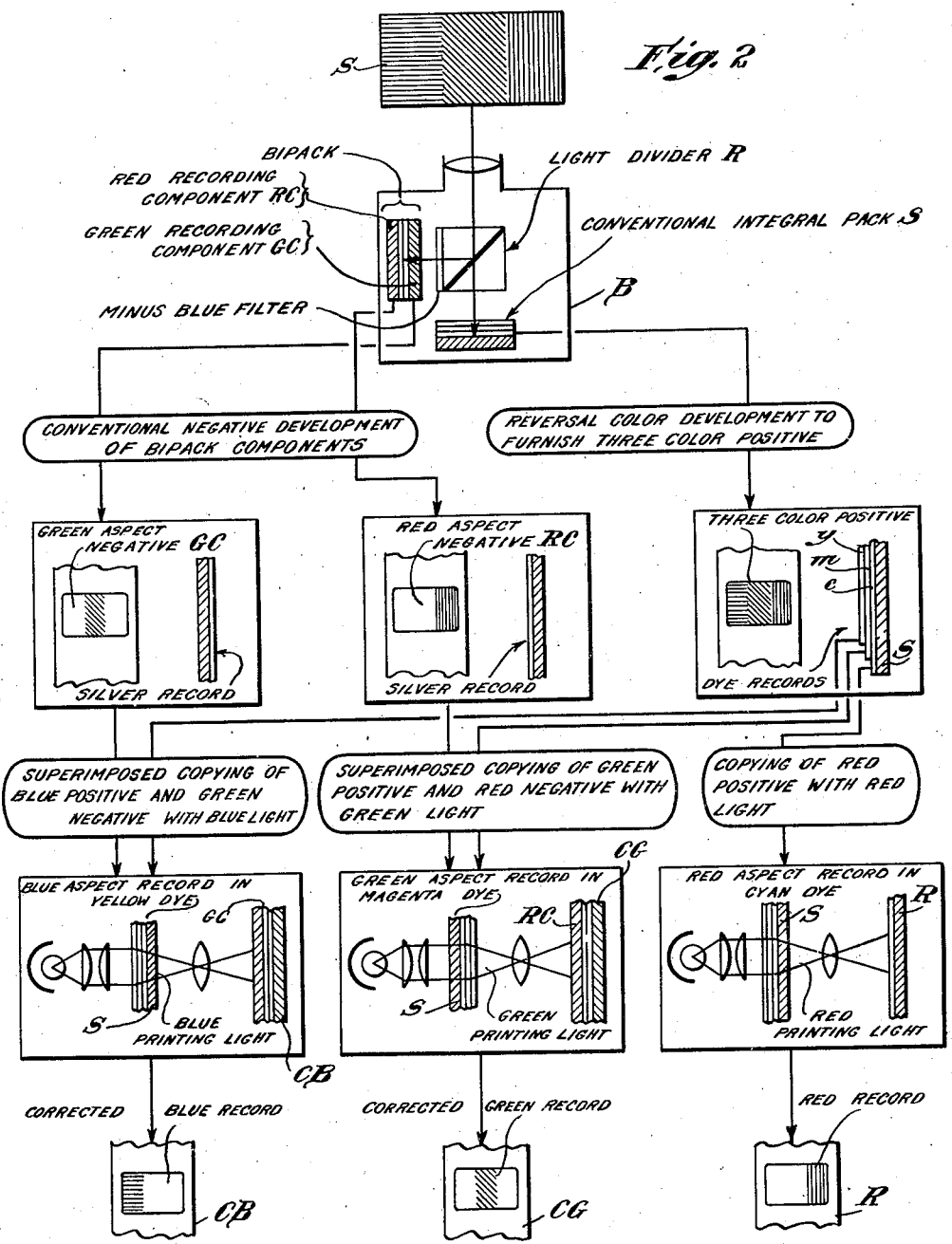
Inventor
Gerald F. Rackett
by Roberts, Cushman & Woodbury
attys.

Patented Dec. 31, 1946

2,413,468

UNITED STATES PATENT OFFICE 2,413,468

COLOR CORRECTION OF COLOR PICTURES

Gerald F. Rackett, Los Angeles, Calif., assignor to Technicolor Motion Picture Corporation, Hollywood, Calif., a corporation of Maine Application November 11, 1942, Serial No. 465,254

3 Claims. (Cl. 95—2)

In making color photographs of the type comprising a plurality of color components, usually yellow, magenta and cyan, it has not been possible to find dyes which have the correct color absorption ranges. For example there is no dye, particularly suitable in other respects for certain purposes, which absorbs blue without also absorbing considerable green, and none which absorbs green without absorbing some red. However it is possible substantially to offset this improper absorption by modifying the density of the dye throughout one or more of the component records. This is accomplished by means of well known so-called masking techniques which permit correction of undesirable absorption properties of the printing material, for example by forming a weak color-correction record of one color aspect and superposing that record over the record of another aspect in making a corrected print of that latter record, the two records being of opposite sign (positive and negative) and the density of the corrected print throughout its entire area corresponding to the algebraic sum of densities of the two records at corresponding points.

When color-separation records representing the blue, green and red aspects of the scene are available the weak color-correction record or records may be printed from one or more of them. However in this case each color-correction record must correspond exactly to one or more of the three color ranges, determined by the color-sensitivity of the negative film and the filters used in making the color-separation negatives, whereas in some cases it is desirable that the color-range of the color-correction record differ from that of each of the color-separation records.

Objects of the present invention are to provide a method of effecting color correction of the kind above referred to which permits the color-correction record to have any desired color-range, whether the same as one of the three color-separation records or a different range, which allows the color-correction record to be processed along with the color-separation records so that if any shrinkage takes place they all shrink to substantially the same extent, which makes the color-correction record available at the same time as the color-separation records, thereby expediting the production of rush prints, and generally to improve the art of correcting the color values of photographic pictures.

According to this invention the color-correction record and the color-separation records are exposed simultaneously with different portions of the same light transmitted from the scene along a common optical path. While this can be accomplished in various ways the records are preferably exposed in a camera having a partially-transmitting reflector to divide the light from the scene along two branch paths, one leading to the color-separation film and the other leading to the color-correction film. For most purposes one color-correction record is sufficient, but if more than one such record is desired they may be exposed simultaneously by employing a bi-pack or a tri-pack, using suitable filters in front of the respective layers of emulsion if desired. If the color-separation records are to be made on separate films the light for exposing these records may be further sub-divided between a plurality of film gates after leaving the aforesaid partially-transmitting reflector. However the preferred way of forming the color-separation records is to employ an integral tri-pack film such as Kodachrome. After the various records have been exposed, they are subjected to developing processes which have like effect upon their size so that if any shrinkage takes place in the wet processes all the films shrink to substantially the same extent. After the records have been developed, they are combined as above described to form color-corrected prints.

For the purpose of illustration typical embodiments of the invention are shown in the accompanying drawings in which Figs. 1 and 2 are diagrammatic representations of two methods, the first involving a single color-correction record and the second involving two color-correction records. In each figure the scene is represented at S, the three portions of which are represented by different cross-hatching to indicate the blue, green and red aspects of the scene, and the camera is indicated at B, the camera having a partially-transmitting reflector D. Thus light is transmitted from the scene along the main optical axis A to the partially transmitting reflector where the light is divided into two branch portions $a$ and $a'$. As shown in the drawings the color-separation records are in the form of an integral pack in the branch path $a$ and the color-correction records are located in the branch path $a'$. In the case of motion picture records the films would feed in the direction perpendicular to the paper. Suitable filters may be located in each branch path as illustrated by way of example by the minus blue filter indicated in the drawings.

As indicated in Fig. 1 the red-green aspect film C is developed to form a color-correction record in silver. Concomitantly the integral pack S is color developed to form three color-separation records in its three layers c, m and y. The two films are subjected to similar wetting and drying conditions so that after they are developed and dried they have substantially the same size. One way of using the color-correction record C in making a corrected print of the blue-aspect of the scene is indicated in the lower left-hand corner of Fig. 1, the yellow component being printed by projection with blue light and the color-correction record C being placed in contact with the film CB so as to modify the printing light as it is projected from the integral packs to the film CB. If the green and red prints G and R are not to be corrected they are printed directly from the magenta and cyan color records in the integral pack, as indicated in the lower right-hand corner of Fig. 1. If the prints CB, G and R are to be used as printing matrices in making an imbibition print, they are prefereably etched to produce positive reliefs which absorb the printing dyes in proportion to the thickness of the gelatin throughout the areas of the records. The matrices may be made in positive form in various ways, as by printing from negative color-separation records, with weak positive color-correction records, followed by normal development, or by printing from positive color-separation records, with a weak negative color-correction record, followed by reversal development.

As indicated in Fig. 2 the color-correction records may comprise a bi-pack, one film of which is sensitized to record a red aspect of the scene and the other film of which is sensitized to record the green aspect of the scene. After exposure the two films of the bi-pack are developed to form a green aspect color-correction negative GB and a red aspect color-correction negative RC, both negatives comprising silver records. The integral packs are color developed to form three color components c, m and y. After the films have been developed and dried the blue-aspect record y is printed on the film CB by projecting blue light through the pack S, the color-correction negative GC being interposed between the two films to correct the print CB. Likewise the magenta record m is projected to a film CG with green light through the color-correction negative RC, thereby to produce a corrected green-aspect print. As indicated at the right-hand side of Fig. 2 the red-aspect record C may be printed on the film R with red light without color-correction.

It should be understood that the present disclosure is for the purpose of illustration only and that this invention includes all modifications and equivalents which fall within the scope of the appended claims. For example, the color-correction record may be made in the form of a color image, as by color development, instead of a silver image; and the printing operations may be carried out either in contact printers or projection printers.

I claim:

1. The method of producing color pictures which comprises simultaneously exposing a plurality of color-separation records in an integral pack and a color-correction record on a separate support with different portions of the same light transmitted from a scene along a common optical path, the integral pack and color-correction records being exposed along branches of said path respectively, subjecting the records to developing processes which have like effect upon their size, making prints with said color-separation records, and in making said prints using said color-correction record to correct the color value of at least one of the prints differentially throughout its area.

2. The method of producing color pictures which comprises simultaneously exposing a plurality of color-separation records in an integral pack and a color-correction record on a separate support with different portions of the same light transmitted from a scene along a common optical path, the integral pack and color-correction records being exposed along branches of said path respectively, the blue light being filtered out of the light portion for the color-correction record, subjecting the records to developing processes which have like effect upon their size, making prints with said color-separation records, and in making said prints using said color-correction record to correct the color value of the blue-aspect print differentially throughout its area.

3. The method of producing color pictures which comprises simultaneously exposing a plurality of color-separation records in an integral pack and a color-correction record on a separate support with different portions of the same light transmitted from a scene along a common optical path, the integral pack and color-correction records being exposed along branches of said path respectively, subjecting the records to developing processes which have like effect upon their size, with said color-separation records printing imbibition matrices, and in making said matrices using said color-correction record to correct the color value of at least one of the prints differentially throughout its area.

GERALD F. RACKETT.